UNITED STATES PATENT OFFICE.

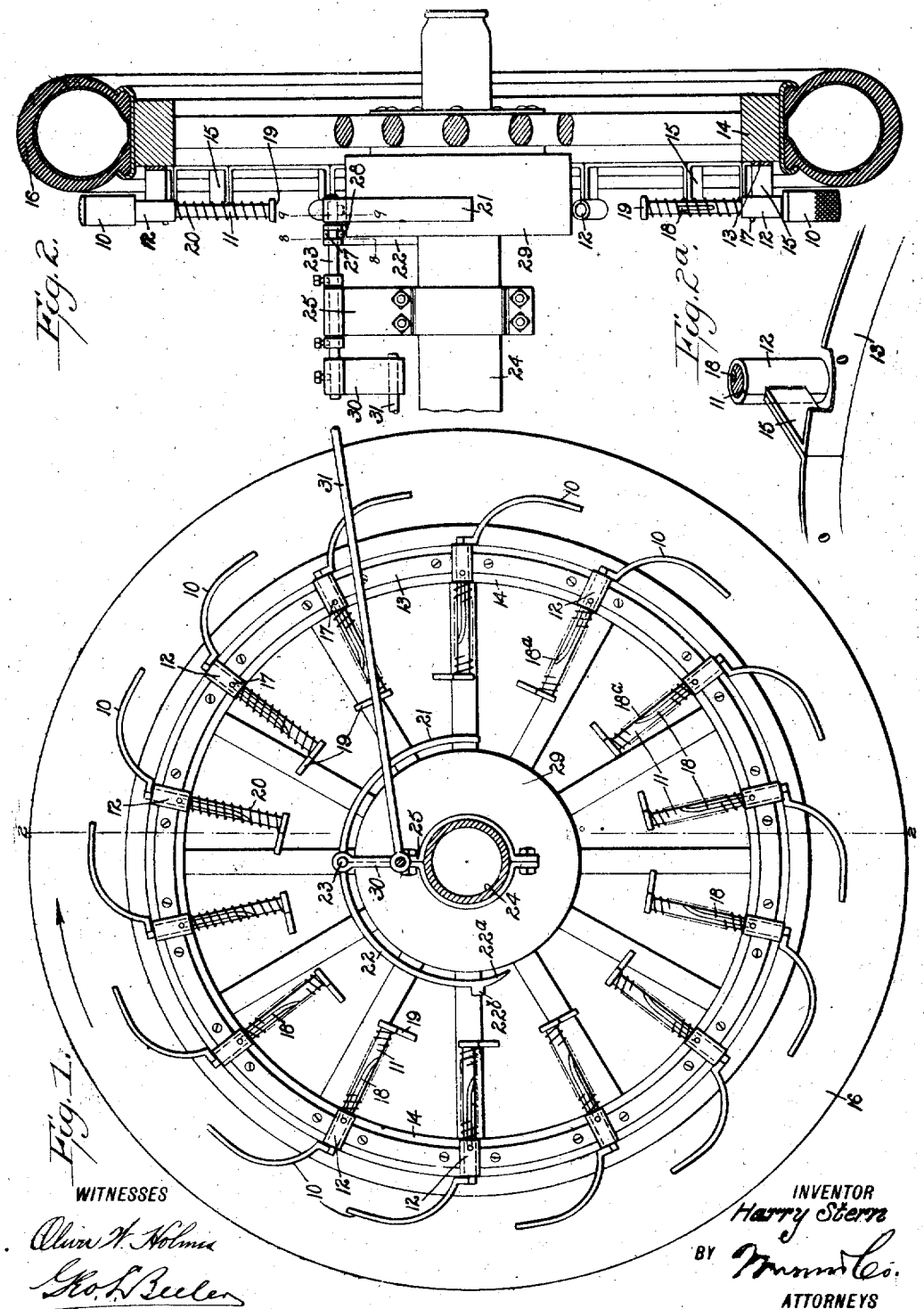

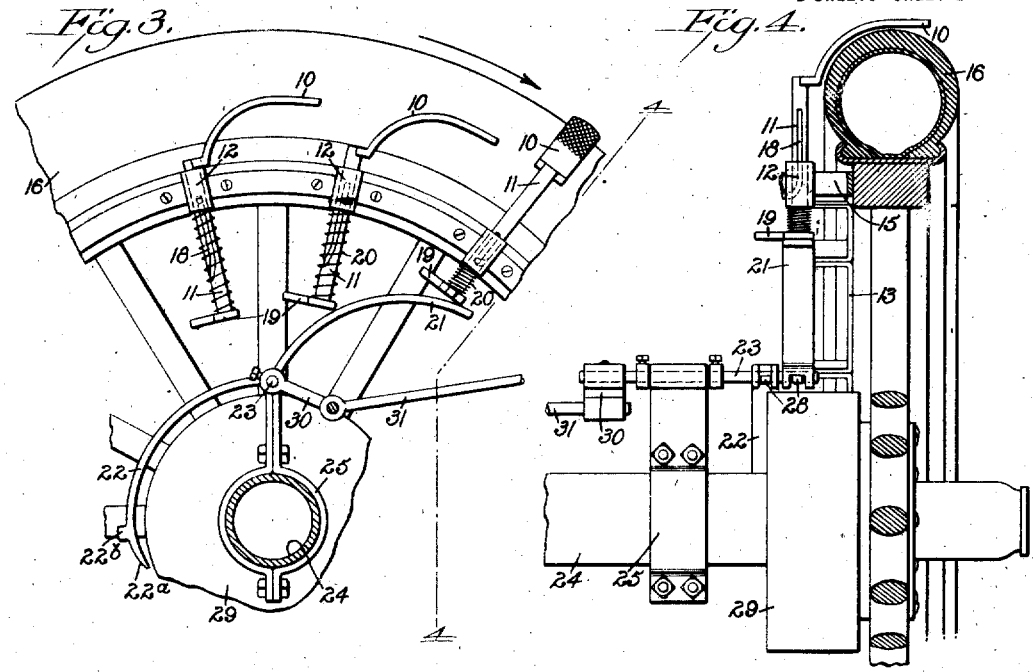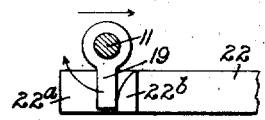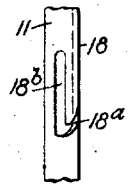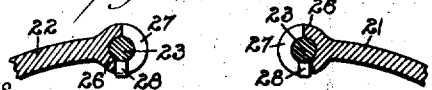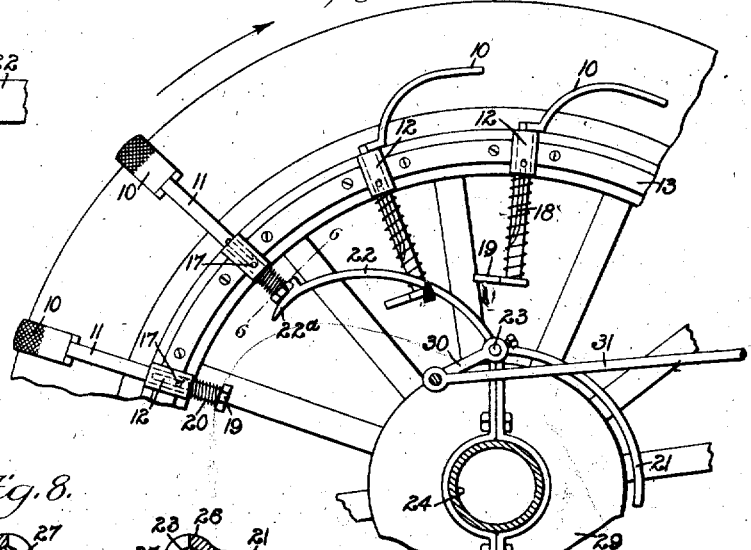

HARRY STERN, OF NEW YORK, N. Y.

AUTOMATIC NON-SKID DEVICE.

1,257,145.   Specification of Letters Patent.   Patented Feb. 19, 1918.

Application filed February 3, 1917. Serial No. 146,380.

*To all whom it may concern:*

Be it known that I, HARRY STERN, a citizen of the United States, and a resident of the city of New York, borough of Manhattan, in the county and State of New York, have invented a new and Improved Automatic Non-Skid Device, of which the following is a full, clear, and exact description.

This invention relates to traction vehicles and especially to the wheels of motor vehicles.

Among the objects of the invention is to provide means carried partly by and partly adjacent to the wheels of such vehicles for the purpose of applying over the treads thereof devices to prevent the skidding or slipping of wheels with respect to the roadway.

Another object of the invention is to provide means under the control of the operator, whereby the non-skid devices for the wheel or wheels may be brought into operative position over or across the tread of the wheel or wheels while the machine is in operation.

Another object of the invention is to provide means to remove the non-skid devices from active position while the vehicle is in motion.

With the foregoing and other objects in view the invention consists in the arrangement and combination of parts hereinafter described and claimed, and while the invention is not restricted to the exact details of construction disclosed or suggested herein except as limited by the claims, still for the purpose of illustrating a practical embodiment thereof reference is had to the accompanying drawings, in which like reference characters designate the same parts in the several views, and in which—

Figure 1 is a side elevation of a wheel equipped with my improvement, the parts being in normal idle position on the inside of the wheel or that side of the wheel adjacent to the vehicle body and showing the axle casing in section;

Fig. 2 is a vertical transverse section on the line 2—2 of Fig. 1;

Fig. 2ᵃ is a detail perspective view of a portion of the annular bracket secured to the inner edge of the wheel rim;

Fig. 3 is a fragmentary view of the same character as Fig. 1, but indicating the action of the setting devices;

Fig. 4 is a vertical transverse section on the line 4—4 of Fig. 3;

Fig. 5 is a side elevation of a fragment of a wheel, but showing the action of the releasing devices;

Fig. 6 is a horizontal sectional detail on the line 6—6 of Fig. 5;

Fig. 7 is a detail view of one of the plungers; and

Figs. 8 and 9 are detail or sectional views on the corresponding lines of Fig. 2.

I provide a series of non-skid elements carried by or adjacent to the tire or periphery of any desired wheel, especially the traction wheels, with the devices so related to the non-skid elements that they are adapted to be moved either into or out of operative position while the wheel is rotating. Each of the non-skid elements comprises what I may term for convenience a finger 10 secured to the outer end of a radially disposed plunger 11. Each plunger is mounted for reciprocation radially of the wheel and for limited rotation around its own axis in a bearing knuckle 12 formed on or carried by an annular bracket 13. This bracket 13 may be arranged or carried in any suitable manner, but preferably is secured rigidly to the inner edge of the standard wheel felly 14. The knuckle 12 is spaced laterally from the plane of the main portion of the bracket 13, being secured thereto by means of a shank 15. The bracket 13 and its attachments may be made in any suitable manner as, for instance, from a single piece of sheet metal, bent in the form indicated in Fig. 2ᵃ. In their normal idle position, the free ends of the fingers project forwardly in the same direction and lie substantially in the same circumference along one side of the tire 16 of the wheel.

Each knuckle 12 is provided with a pin 17 which projects through the shell thereof into a groove 18 formed in the plunger 11. Said groove is straight and longitudinal of the plunger throughout the greater portion of its length, but toward its inner end or the end nearer the inner end of the plunger, the groove is arranged so as to make a quarter spiral, as shown at 18ᵃ, terminating at the inner end of the spiral in an outwardly extending straight portion 18ᵇ. See Fig. 7. The parts of the groove 18 and 18ᵇ, therefore, are parallel to each other and arranged ninety degrees apart around the axis of the plunger.

Secured to the inner end of each plunger 11 is a foot 19, the axis of which is perpendicular to the axis of the plunger and parallel to the general direction of the finger, though on the opposite side of the plunger from the finger. That is to say, while the finger normally projects forwardly with respect to the rotation of the wheel, the foot projects rearwardly. A coil spring 20 surrounds the plunger and operates between the knuckle 12 and the foot 19 with a tendency to hold the non-skid member inwardly toward the axis of the wheel, or with the finger bearing substantially against the outer end of the knuckle. With the parts constructed and mounted as indicated and above described, there is very little of the mechanism visible from the outside of the wheel or on the side opposite the vehicle body.

From what has been stated, it will be understood that the fingers 10 are adapted to be forced outwardly and so turned as to extend across the tread portion of the tire 16 where they will act in the usual manner of non-skid attachments. As a suitable means for controlling the position of the non-skid elements, I provide a pair of actuators, one a setting device 21 and the other a releasing device 22, adapted to operate upon the inner or foot ends of the plungers to cause them to move radially of the wheel and while they are moving thus radially to be turned through an angle of ninety degrees, due to the coöperation between the pin 17 and the groove 18.

The actuators 21 and 22 are both mounted loosely upon a rock shaft 23, shown in this instance as being journaled above and upon the axle casing 24, by means of a bracket 25. Each actuator has a hub 26 provided with an arcuate slot 27 through which projects a lug 28 fixed to the rock shaft. Each actuator rests normally by gravity in a position closely adjacent to the brake drum 29 with the lower portion of the hub thereof bearing against the lug 28 in its slot 27.

A crank 30 is shown secured to the inner end of the rock shaft, said crank projecting normally downwardly toward the axle casing. A rod 31, or its equivalent, is connected to the free end of the crank and by manipulation of this rod 31, the operator of the machine may cause either of the actuators to be brought into operation.

The setting device 21 occupies a position in the same plane as all of the feet 19. Or, in other words, the main axis of the device 21 lies in the same plane as the axes of all of the plungers 11. By pulling forwardly upon the rod 31, as shown in Fig. 3, the setting device 21 is swung upwardly from its normal position where it will be struck in succession by the several feet or inner ends of the plungers. The plungers, therefore, are thereby caused to be forced outwardly radially along their respective knuckles 12 and have imparted to them a quarter turn just about the time they are caused to approach the outer limit of movement. The free end of each finger is thus caused to swing transversely across the tread portion of the tire around an axis radial to the axis of the wheel, and as the end of the plunger passes beyond the end of the setting device 21 the spring 20 causes said finger to snap down over the tread of the tire, the plunger thus being adapted for radial reciprocation as well as rotation around its radial axis.

The pin 17 at this time will lie in the straight portion 18ᵇ of the groove. This groove 18ᵇ provides for that amount of radial reciprocation of the non-skid elements which results from the ordinary flexibility of the tire. Since the fingers hug tightly over the tread portion of the tire, there is practically no possibility for the fingers to turn in practice, due to contact with the roadway. The outer surfaces of the fingers may be roughened as indicated to increase their tractive effect. It will be appreciated that this actuation of the non-skid elements from their idle to their operative position, is effected substantially automatically and while the wheel is rotated. After all of the fingers have been moved to their operative position, the operator will release the rod 31 and the setting actuator 21 will be brought back to its normal idle position. The fingers 10 will thus be retained in their active position indefinitely or until they are desired to be returned to their idle or obscure position.

According to the devices indicated herein, the non-skid elements are returned to their idle position by means of the actuator or releasing device 22. When the operator moves the rod 31 in the opposite direction from that above described, the actuator 22 will be lifted to the position shown in Fig. 5. This actuator, however, is arranged with its axis in a plane spaced laterally from the plane of the setting member 21, or in a plane in position to be engaged by the free ends of the feet 19, which at this time project laterally or in a direction away from the wheel. The releasing member 22 is provided with a curved or cam-shaped receiving point 22ᵃ, which is directed inwardly toward the axis of the wheel far enough to receive the free end of each foot 19. The cam portion, however, of this member has outward throw sufficient to cause the plunger received thereon to be moved outwardly radially far enough to withdraw the pin 17 from the straight portion 18ᵇ of the groove and to unseat the finger from direct contact with the tread of the tire. By this time therefore the foot will strike against a lug 22ᵇ at the upper end of the cam 22ᵃ, which will cause the plunger to start to rotate around its axis, when by this time the pin 17 will occupy the spiral portion of the groove, and when the foot passes the lug 22$^b$, the spring 20 will snap the plunger and its finger inwardly toward the axis of the wheel. See Figs. 5 and 6. So all of the non-skid elements will be released successively and returned automatically to their idle position. The releasing actuator then will be dropped to its idle position as shown in Fig. 1.

I claim:

1. The combination with a wheel and a circular series of non-skid elements for the periphery thereof, of means to withdraw the non-skid elements in succession from said periphery automatically.

2. The combination with a wheel and independent non-skid elements for the periphery thereof, of means to withdraw said non-skid elements in succession from said periphery while the wheel is rotating in normal operation.

3. The combination with a wheel, a series of non-skid elements for the tread of the wheel and supporting means for the non-skid means at one side of the wheel, of means acting upon the non-skid elements in succession to cause the same to be moved both into and out of active position over said tread while the wheel is in normal running operation.

4. The combination with a wheel, non-skid elements for the tread thereof and supporting means for the non-skid elements carried by one side of the wheel and holding them in position for movement around axes radial to the axis of the wheel, of relatively stationary actuator means acting upon the non-skid elements to move the same around said axes, both into and out of active position with respect to the tread while the wheel is in running operation.

5. The combination with a vehicle wheel including a rim and a tread portion, of non-skid means for said tread and supporting means for the non-skid means carried rigidly by the inner edge of said rim, said non-skid means being carried normally idle on the inner or obscure side of the wheel and radially within the tread thereof, said non-skid means being supported for movement both along and around axes radial to the wheel, and relatively stationary means carried by the vehicle to move the non-skid means both into and out of position over the tread while the vehicle is in motion.

6. The combination with a vehicle wheel, of a series of non-skid elements carried by the wheel, each of said elements being movable independently of the others outwardly radially of the wheel and then rotatable around an axis coinciding with the line of outward movement so as to bring the same into active non-skid position upon the periphery of the wheel, and actuator means carried by the vehicle to effect such outward movement.

7. The combination with a vehicle wheel including a felly and a series of cylindrical knuckles carried by the felly on the side of the wheel toward the vehicle body, the axes of the knuckles being radial with respect to the axis of the wheel, of a plunger-mounted in each of said knuckles and adapted for outward radial reciprocation therein, means acting upon the plunger tending to resist such outward movement, a non-skid finger fixed to the outer end of the plunger and normally at one side of the wheel, actuator means serving to force the plunger outwardly, and means carried by the knuckle and coöperating with the plunger to swing the finger around the axis of the plunger and across the tread of the wheel while the plunger is approaching its outward limit of movement.

8. The combination with a vehicle wheel including a felly and a series of cylindrical knuckles fixed to said felly and having radial axes, of a plunger fitted in each knuckle and adapted for reciprocation along the radial axis thereof and rotation around said axis, pin and slot connections between the knuckle and the plunger serving to cause a predetermined degree of rotation thereof during a portion of the reciprocation, a non-skid finger fixed to the outer end of each plunger and held thereby normally in inactive position at one side of the wheel but being swung by the rotation of the plunger around the axis of the knuckle into active position on the tread portion of the wheel, and means acting upon the inner end of the plunger to release the finger from the tread and return it and the plunger to normal inactive position.

9. The combination with a vehicle wheel and a circular series of cylindrical knuckles carried thereby with their axes radial of the axis of the wheel, of a series of independently movable non-skid elements carried by the several knuckles, each non-skid element comprising a plunger fitted for reciprocation along and partial rotation around the axis of its knuckle and a finger fixed to the outer end of the plunger, the plunger being provided with a groove having a straight portion at its outer end and a spiral portion at its inner end and the knuckle being provided with a pin projecting into said groove whereby when the plunger is moved outwardly the pin will cause rotation of the plunger and the swinging of the finger around the axis of the plunger, means to force the plunger and finger outwardly, and means acting upon the inner end of the plunger to restore the same and the finger inwardly into idle position.

HARRY STERN.